United States Patent [19]

Kautt

[11] Patent Number: 5,140,743
[45] Date of Patent: Aug. 25, 1992

[54] AUTOMATIC MACHINE FOR FITTING STRIKING PLATES TO FIXED FRAMES OF WINDOWS OR FRENCH WINDOWS

[75] Inventor: Jean-Jacques Kautt, Strasbourg, France

[73] Assignee: Ferco International Usine de Ferrures de Batiment, Sarrebourg, France

[21] Appl. No.: 694,483

[22] Filed: May 2, 1991

[30] Foreign Application Priority Data

May 21, 1990 [FR] France .................. 90 06303

[51] Int. Cl.⁵ .................................... B23P 21/00
[52] U.S. Cl. .................................... 29/701; 29/786; 29/787
[58] Field of Search ............... 29/701, 702, 703, 771, 29/786, 787, 809; 227/19, 39, 43; 414/744.1

[56] References Cited

U.S. PATENT DOCUMENTS

| | | | |
|---|---|---|---|
| 4,100,661 | 7/1978 | Cheak | 29/787 X |
| 4,175,313 | 11/1979 | Neumann | 29/771 X |
| 4,819,324 | 4/1989 | Roberts | 29/771 |
| 5,018,264 | 5/1991 | Kautt . | |
| 5,069,739 | 12/1991 | Kautt . | |

FOREIGN PATENT DOCUMENTS

| | | | |
|---|---|---|---|
| 0240968 | 10/1987 | European Pat. Off. . | |
| 0401094 | 5/1990 | European Pat. Off. . | |
| 2361926 | 12/1973 | Fed. Rep. of Germany . | |
| 2918470 | 4/1980 | Fed. Rep. of Germany | 29/787 |
| 8908450 | 7/1989 | Fed. Rep. of Germany . | |
| 2022664 | 12/1979 | United Kingdom . | |
| 2047214 | 11/1980 | United Kingdom | 29/787 |

*Primary Examiner*—Timothy V. Eley
*Attorney, Agent, or Firm*—Wegner, Cantor, Mueller & Player

[57] ABSTRACT

An automatic machine for fitting striking plates to prefabricated fixed frames of windows or French windows is associated with a fixed frame feed device. It comprises at least one fitting unit adapted to be displaced automatically relative to the fixed frame. It further comprises at least one second fitting unit adapted to fit bottom striking plates to the fixed frame, in particular for tilt-turn windows. The displacements of the beam, the carriage and the fitting unit are program-controlled to enable the fitting of top striking plates to the top crossmember of the fixed frame and the fitting of striking plates to the uprights of the fixed frame.

8 Claims, 2 Drawing Sheets

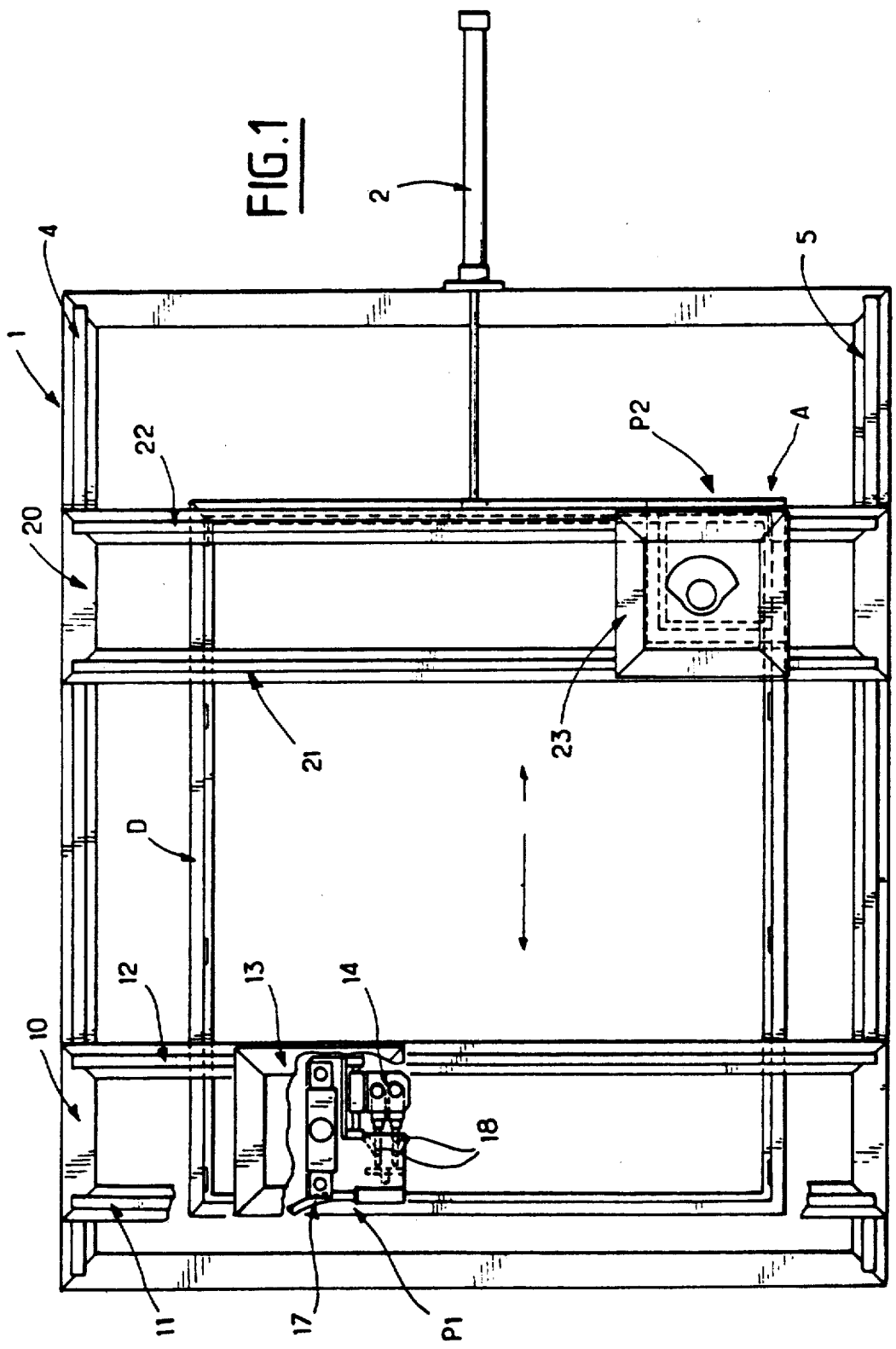

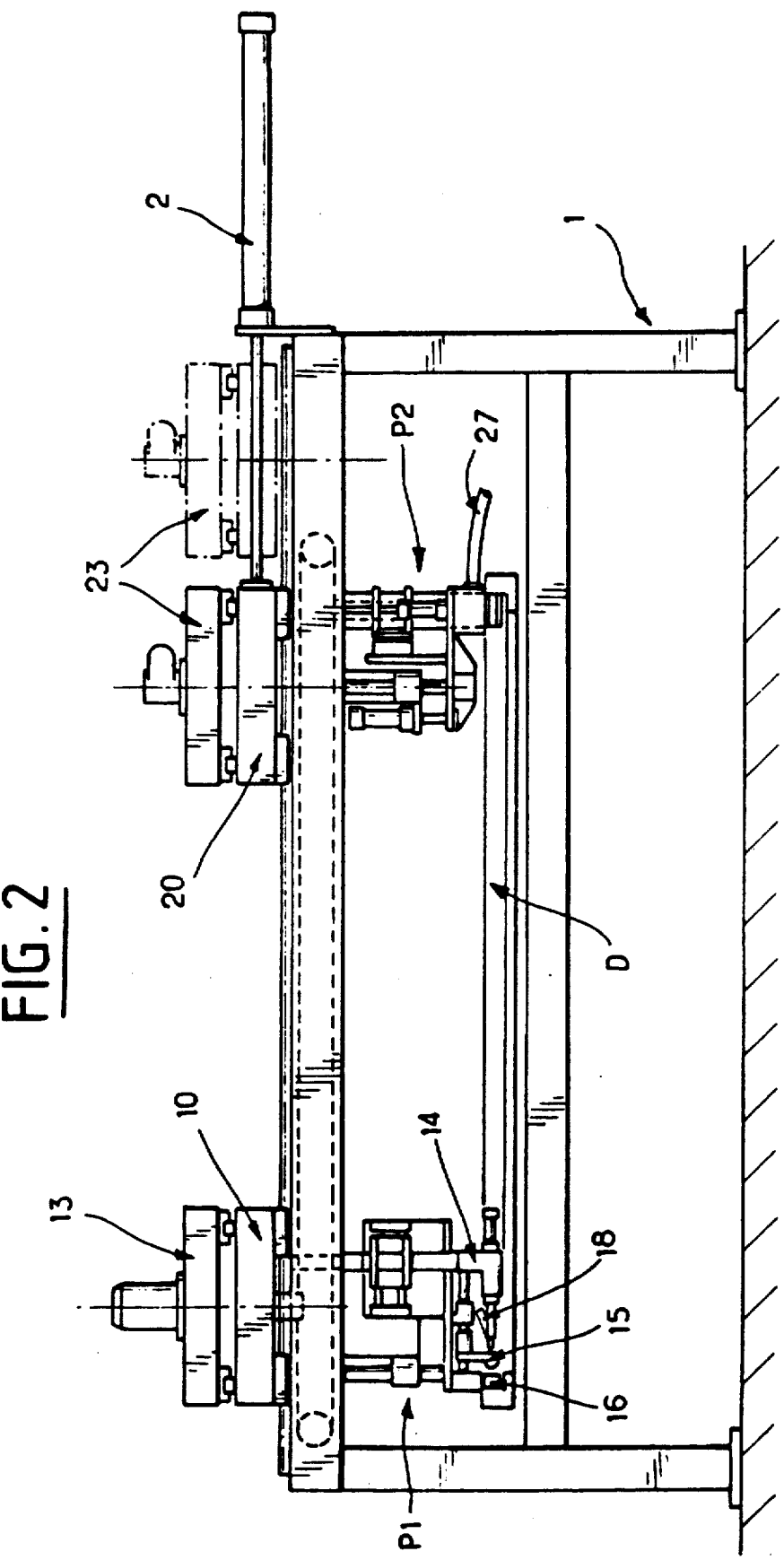

AUTOMATIC MACHINE FOR FITTING STRIKING PLATES TO FIXED FRAMES OF WINDOWS OR FRENCH WINDOWS

BACKGROUND OF THE INVENTION

1. Field of the invention

The present invention concerns an automatic machine for fitting striking plates. This machine is designed in particular to fit striking plates to fixed frames of windows or French windows.

2. Description of the Prior art

These fixed frames are designed to receive one or more opening frames. If the fixed frame is to be fitted with more than one opening frame, it comprises in addition to a conventional frame one or more additional crossmembers or one or more additional uprights so that the fixed frame is made up of a number of subframes. The machine in accordance with the invention enables striking plates to be fitted to any fixed frame design.

To enable the opening frame(s) to be fitted to it, the fixed frame must be equipped with various fittings and in particular appropriate striking plates.

There are two types of striking plates namely those which merely serve to latch the opening frame to the fixed frame and those which, in addition to this primary function, also cause displacement of the opening frame on opening or closing, for example, a tilt-turn opening frame.

Depending on how the opening frame opens, and therefore on the type of fitting, it is also necessary to fit one or both uprights or one or both crossmembers with striking plates.

In some cases striking plates are fitted all around the fixed frame and it is then usual to speak of a peripheral fitting or peripheral closure.

To simplify the following description reference will made to fitting striking plates to a fixed frame, by which is meant either a basic fixed frame or any of the subframes of a fixed frame as mentioned above.

In a prior art technique that is still in widespread use, the material of the fixed frame is treated or machined to receive fittings which are attached by hand. There are also semi-automatic machines in the form of individual automatic units arranged in a line along which either an upright or a crossmember of each frame is passed. However, existing machines always require the presence of operators to manipulate the frames or the tools. What is more, given the different shapes and designs of the components, current semiautomatic lines require a variety of tools or automatic units and in very many cases manual assembly is preferred as it is more cost-effective than a machine which automates the work for only one specific application.

The aim of the invention is to provide a fully automatic machine that can be used with any type of striking plate and any type of fixed frame, all manual operations being eliminated and the unequipped fixed frames being fed automatically to the machine.

In particular, this machine enables conventional top striking plates and bottom striking plates to be fitted, the latter being used in particular for tilt-turn systems.

SUMMARY OF THE INVENTION

The invention consists in an automatic machine for fitting striking plates to prefabricated fixed frames of windows or French windows adapted to be associated with a fixed frame feed device, said machine comprising:

a fixed frame support, at least one two-axis displacement system including a beam mobile in translation relative to said support in a first direction and a carriage mobile in translation relative to said beam in a second direction perpendicular to said first direction, and mounted on said carriage, a striking plate fitting unit comprising:

a device for positioning and holding the striking plate to be fitted, and at least one screwing unit.

The fitting unit is preferably mounted on a carriage movable longitudinally on a beam movable perpendicular to the direction of movement of the carriage on a gantry frame.

This embodiment is preferred, but the same result can be achieved by providing a fixed fitting unit and by controlling the movement of the fixed frame on a conveyor belt supporting the frame.

To enable the fitting of bottom striking plates, in particular for tilt-turn opening frames, the machine comprises at least a second striking plate fitting unit identical to the first unit.

The second unit is preferably connected to a piston-and-cylinder actuator, the cylinder of which is fixed to the gantry frame so that it can be retracted or deployed to a working position appropriate to the type of fixed frame.

The invention is described in more detail below with reference to the drawings showing one embodiment of the invention.

BRIEF DESCRIPTION OF THE DRAWINGS

FIG. 1 is a plan view of a machine in accordance with the invention.

FIG. 2 is a front view of the machine.

DETAILED DESCRIPTION OF THE INVENTION

FIGS. 1 and 2 show an automatic machine for fitting striking plates. On a fixed frame assembly line the machine is associated with fixed frame feed means in which the fixed frame's outer side is in contact with the conveyor belt and its top crossmember is at the leading end as it is moved along by the conveyor belt.

Referring to FIGS. 1 and 2, the machine comprises a supporting frame or gantry 1 provided with means for displacing the frame, preferably a conveyor belt, and means for immobilizing the frame when it reaches the position for fitting the striking plates.

The frame 1 comprises two rails 4 and 5 which support two beams 10 and 20.

Each beam comprises longitudinal rails 11 and 12, 21 and 22 on which moves longitudinally a respective striking plate fitting module P1, P2.

FIG. 1 shows the machine with a fixed frame D locked into the position for fitting striking plates and the fitting modules P1 and P2 ready to fit the striking plates.

The beam 20 is connected to a pneumatic piston-and-cylinder or like actuator 2 adapted to retract the beam 20 or to deploy it if the bottom crossmember of the fixed frame is to be fitted with striking plates.

The other beam 10 performs a controlled displacement to fit striking plates to the upper crossmember and where applicable to the uprights of the fixed frame D.

To enable striking plates to be fitted to the bottom crossmember, the fitting module P2 is displaced on the rails 21, 22 of the beam 20 in translation and rotation without requiring intermediate positioning between 0° and 180° to fit the striking plates to the bottom corners of the fixed frame. The top striking plate fitting module P1 is provided with a device for rotation through 180° so that it can fit striking plates to the top crossmember and where necessary to the uprights of the fixed frame D.

Each fitting module therefore comprises a shaft rotatable relative to the carriage 10, 20 to rotate the fitting tools.

The fitting tools are more clearly seen in FIG. 2 and comprise a striking plate feed hose 17, 27, a screwing unit 14 with associated screw feed hoses 18, a holding device 15 and a plunger 16 for positioning the striking plate.

To cater for all types of fixed frame the fitting tools are also movable vertically.

The parts to be supplied to the fitting tools (striking plates, screws) are stored and fed by vibrating bowl systems with associated hoses so that the part storage devices do not need to follow the movement of the fitting tools.

The displacement of the fitting tools to the fitting location and the positioning and fixing of the striking plates are programmed automatically.

When the fitting unit P1 is positioned, the positioning plunger 16 is lowered by the actuator to the working location on the fixed frame D and the striking plate is released from the plunger 16 and held by a holding device 15 which can also serve as a template. The screwing device 14 is then maneuvered into position to screw on the striking plate. It comprises two screwing heads fed by a screw feed hose 18. The two heads can be fixed relative to each other when the fixing dimensions are standardized or the distance between them can be variable, the plunger 16 then serving as a template for positioning the screwing heads at the locations of the holes in the striking plates.

The devices described above are provided on the fitting unit P1 and also on the fitting unit P2. The latter can also receive other fixed frame preparation tools as required (grinding, drilling, etc tools).

In the preferred application, namely the fitting of tilt-turn frame bottom striking plates (the tilting action of the opening frame requires the bottom roller to be released from the fitting on the opening frame without it leaving the striking plate), the dimensions and fixing dimensions are different from those of the other, latching striking plates.

The machine as described above can be modified without departing from the scope of the invention.

In particular, it is possible to combine all the operations carried out on all types of striking plate in a single fitting unit and it is then the fixed frame conveyor means which displaces and positions the fixed frame at the various places where a striking plate must be fitted. In this case the fitting unit comprises the tools described above and the relative movement of the fitting unit and the frame is the reverse of that described above.

There is claimed:

1. A machine for automatically fitting striking plates to prefabricated fixed window frames, said machine comprising:
    a fixed support;
    a beam member movably mounted on said fixed support such that said beam member is movable along the fixed support in a first direction;
    a carriage movably mounted on said beam member such that said carriage is movable along said beam member in a direction which is perpendicular to said first direction; and
    fitting means mounted on said carriage for fitting a striking plate to a fixed window frame, said fitting means comprising means for positioning and holding the striking plate at a desired position in relation to the fixed window frame and fastening means for screwing the striking plate to the fixed window frame.

2. The machine according to claim 1, wherein said fastening means is mounted on said carriage such that said fastening means is vertically movable in relation to said carriage.

3. The machine according to claim 2, further comprising means for feeding screws to said fastening means.

4. The machine according to claim 1, further comprising means for feeding striking plates to said fitting means.

5. The machine according to claim 1, wherein said fitting means is mounted on a rotatable shaft of said carriage, such that said fitting means is rotatable in relation to said carriage.

6. The machine according to claim 1, comprising:
    said fixed support;
    a first beam support movably mounted on said fixed support such that said beam member is movable along the fixed support in a first direction;
    a second beam member movable mounted on said fixed support such that said beam member is movable along the fixed support in said first direction;
    a first carriage movably mounted on said first beam member such that said first carriage is movable along said first beam member in a direction which is perpendicular to said first direction;
    a second carriage movably mounted on said second beam member such that said carriage is movable along said beam member in a direction which is perpendicular to said first direction;
    first fitting means mounted on said first carriage for fitting a first striking plate to a fixed window frame, said first fitting means comprising means for positioning and holding the striking plate at a desired position in relation to the fixed window frame and fastening means for screwing the striking plate to the fixed window frame; and
    second fitting means mounted on said second carriage for fitting a second striking plate to the fixed window frame, said fitting means comprising means for positioning and holding the striking plate at a desired position in relation to the fixed window frame and fastening means for screwing the striking plate to the fixed window frame.

7. The machine according to claim 6, further comprising a piston-and-cylinder actuator connected to said second beam for positioning the second beam between an operable and an inoperable position along said fixed support.

8. The machine according to claim 1, further comprising control means for controlling movement and operation of said beam, said carriage and said fitting means.

* * * * *